W. D. BOLLINGER.
Carriage Axle.
No. 82,483.
Patented Sept. 29, 1868.
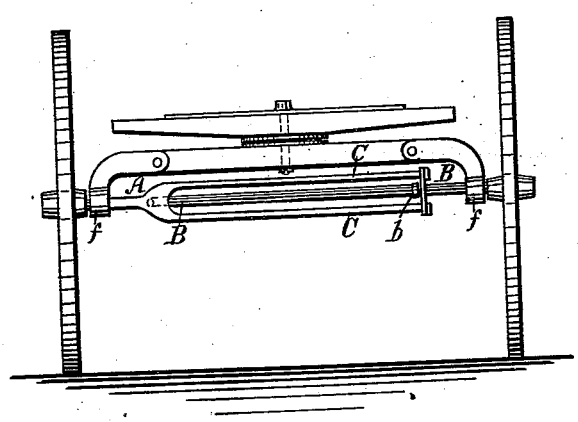
Witnesses:
A. W. Almqvist
G. C. Cotton
Inventor:
W. D. Bollinger
per Munn &
Attorneys

United States Patent Office.

W. D. BOLLINGER, OF CEDAR RAPIDS, IOWA.

Letters Patent No. 82,483, dated September 29, 1868.

IMPROVEMENT IN AXLES FOR CARRIAGES.

*The Schedule referred to in these Letters Patent and making part of the same.*

TO ALL WHOM IT MAY CONCERN:

Be it known that I, W. D. BOLLINGER, of Cedar Rapids, in the county of Linn, and State of Iowa, have invented a new and useful Improvement in Axles for Carriages; and I do hereby declare that the following is a full, clear, and exact description thereof, which will enable others skilled in the art to make and use the same, reference being had to the accompanying drawing, forming part of this specification.

This invention relates to improvements in axles for carriages, and has for its object to provide an arrangement whereby the wheels may be connected rigidly to the axle, and yet be independent of each other.

It consists in providing a compound axle, having one part arranged to work within the other, as will be hereinafter described.

The drawing represents a side elevation of one form of my improved axle, with a pair of wheels attached thereto.

A represents one portion of the axle, which is bifurcated, and provided with a socket at $a$.

B represents the other portion of the axle, which is provided with a collar at $b$.

The two parts are joined together by inserting the inner end of the part B in the socket $a$ of the part A, and screwing the yoke $e$ to the end of the two parts $c$ and $d$ of the part A, the part B passing through a central hole in the said yoke, and being maintained, in connection with the part A, by the action of the said yoke against the collar $b$.

The carriage-body may be supported upon the round portions of the axles $f$, near the hubs, which constitute the bearings wherein the axles turn, when the wheels, which are rigidly secured to the parts A and B, respectively are turning.

When the carriage is moving in a straight line, the two parts of the axle will revolve together; but when going around a curve, one part will turn on the other sufficiently to compensate for the difference of speed of the two wheels.

Instead of bifurcating the part A, as described, it may be made tubular for about the same distance, and the part B inserted in the tubular portion.

Having thus described my invention, I claim as new, and desire to secure by Letters Patent—

Axles for wagons, cars, and other carriages, made in two parts, at A and B, and connected together, substantially as and for the purpose described.

W. D. BOLLINGER.

Witnesses:
C. H. THOMPSON,
J. K. BOYD.